G. F. STEEDMAN.
TIRE INFLATING APPARATUS.
APPLICATION FILED JAN. 29, 1916.
1,239,737.
Patented Sept. 11, 1917.
2 SHEETS—SHEET 2.
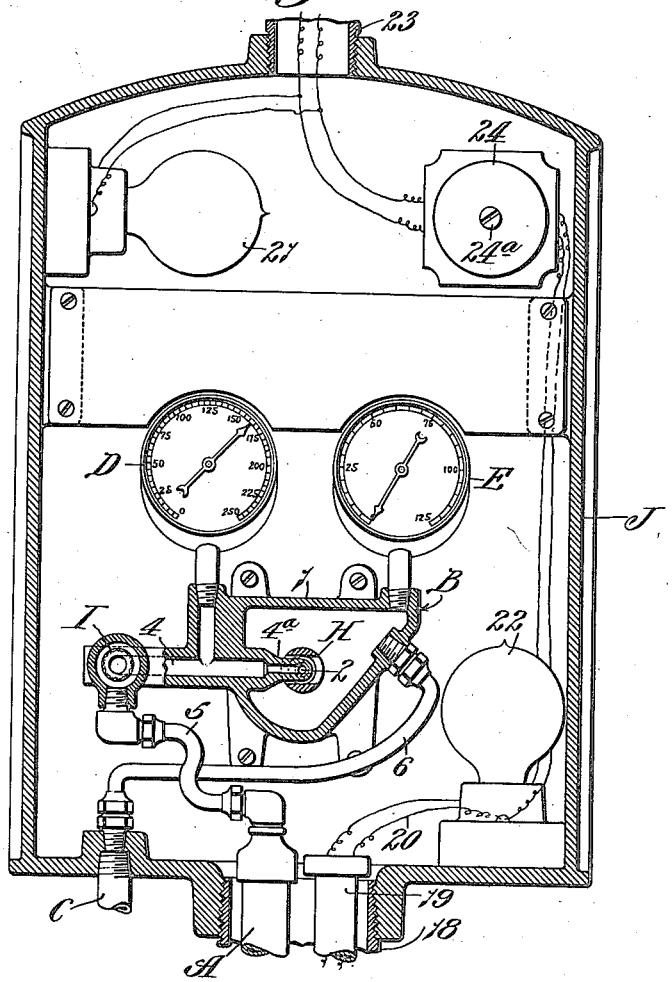
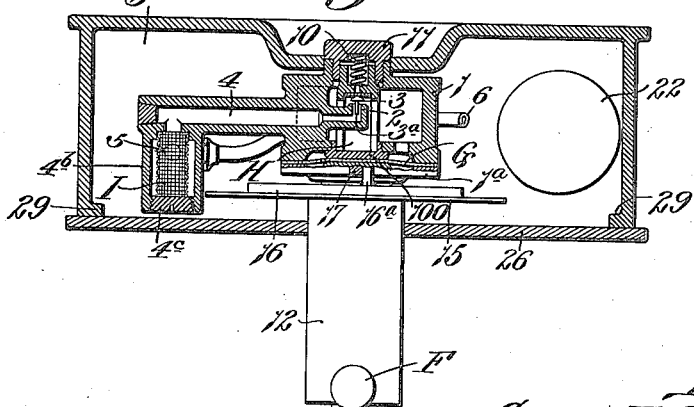
Inventor
George F. Steedman.
By Bakewell & Church attys.

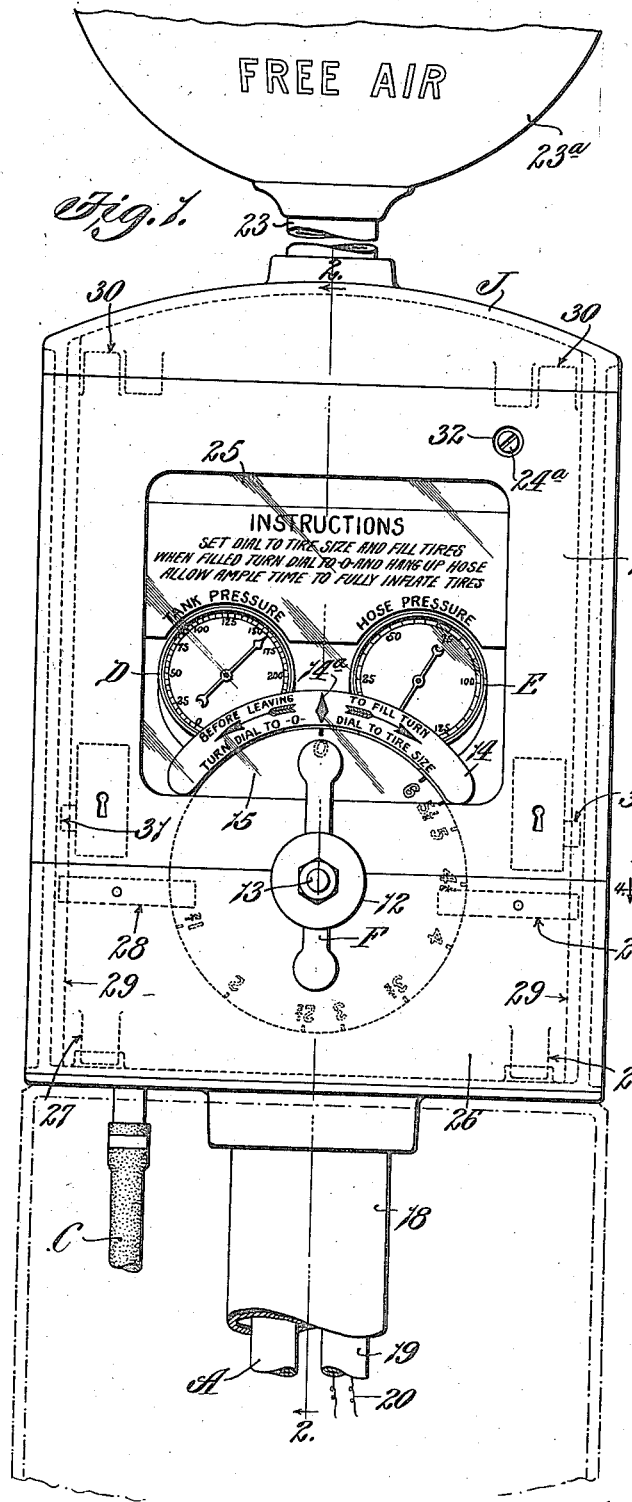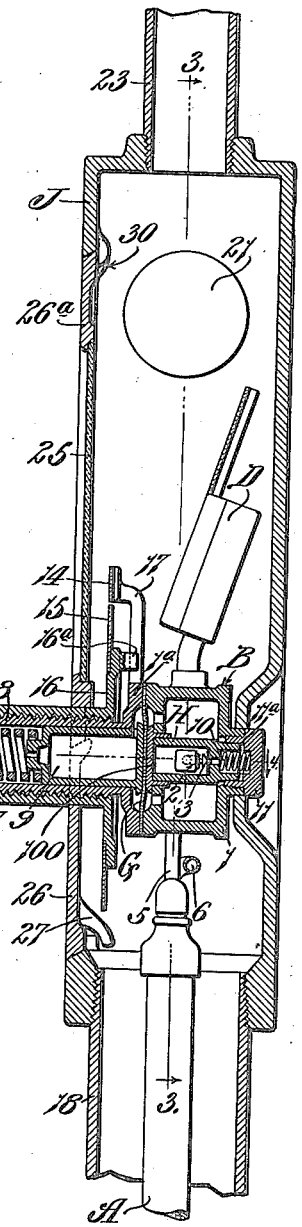

UNITED STATES PATENT OFFICE.

GEORGE F. STEEDMAN, OF ST. LOUIS, MISSOURI, ASSIGNOR TO CURTIS & CO. MFG. CO., OF WELLSTON, MISSOURI, A CORPORATION OF MISSOURI.

TIRE-INFLATING APPARATUS.

1,239,737.   Specification of Letters Patent.   Patented Sept. 11, 1917.

Application filed January 29, 1916.   Serial No. 75,068.

*To all whom it may concern:*

Be it known that I, GEORGE F. STEEDMAN, a citizen of the United States, residing at St. Louis, Missouri, have invented a certain new and useful Improvement in Tire-Inflating Apparatus, of which the following is a full, clear, and exact description, such as will enable others skilled in the art to which it appertains to make and use the same.

This invention relates to an apparatus for inflating pneumatic tires.

One object of my invention is to provide an apparatus which tends to reduce an automobilist's "tire troubles" by insuring inflation to proper pressure of the pneumatic tires on his machine.

Another object is to provide a tire-inflating apparatus which is so constructed that a pneumatic tire can be inflated to a certain predetermined pressure without repeatedly removing the air supply hose or filling hose from the valve stem of the tire and testing the air pressure of the tire with a gage, as is now the general practice in inflating pneumatic tires.

Another object is to provide a tire-inflating apparatus that comprises a visual indicator or dial which is adapted to be arranged in different positions, according to the size of the tire being inflated, and an automatically-operating means that prevents the tire from being inflated to a pressure greater than the pressure which is correct for a tire of the size at which the indicator is set.

Another object is to provide a tire-inflating apparatus that is equipped with gages for indicating the pressure in the supply tank and in the hose leading to the tire being inflated, an adjustable reducing valve that automatically governs the supply of air to the tire, and a visual indicator to guide the user in setting the reducing valve properly, said indicator being combined with said reducing valve in such a manner that the act of changing the position of the indicator automatically changes the adjustment or condition of said reducing valve.

Another object is to provide an apparatus of the character just referred to, in which the gages, the reducing valve and the indicator are arranged inside of a casing that is adapted to be mounted on a post or connected to a supporting structure, thus producing a tire-inflating apparatus that can be installed easily; which presents a neat and ornamental appearance and in which all of the working parts are protected from the weather and from theft and are prevented from being tampered with.

And still another object of my invention is to provide a device for inflating pneumatic tires of various nominal sizes which will receive air from a source of relatively high pressure and automatically reduce said high pressure to lower pressures appropriate to the various commercial sizes of tires, eliminating danger of bursting tires, due to too high pressure, or of damaging tires, due to filling to too low pressure, and at the same time permit of the storage of compressed air at high pressure, such storage enabling a small air compressor to store up air in an efficient manner. Other objects and desirable features of my invention will be hereinafter pointed out.

Figure 1 of the drawings is a front elevational view of a tire-inflating apparatus constructed in accordance with my invention.

Fig. 2 is a vertical sectional view of said apparatus, taken on the line 2—2 of Fig. 1.

Fig. 3 is a vertical sectional view, taken on the line 3—3 of Fig. 2; and

Fig. 4 is a horizontal sectional view, taken on the line 4—4 of Fig. 2.

Briefly described, my invention consists of a pneumatic tire-inflating apparatus provided with an adjustable reducing valve that automatically governs the supply of air to the tire being inflated. Said reducing valve is adapted to be set or adjusted in different positions by the person using the apparatus, according to the pressure desired in the particular size of tire being inflated, and in order to guide the user in setting the reducing valve properly, I have provided the apparatus with a visual indicator or dial which shows the nominal cross-sectional sizes of standard pneumatic tires, said indicator being combined with the reducing valve in such a manner that the adjustment of the valve will be changed automatically whenever the position of the indicator is changed. Separate and distinct pressure gages are preferably employed for indicating the pressure of the supply tank and the pressure in the hose leading to the tire, and a housing is employed for protecting said gages and indicator from the weather and for preventing them from being stolen or from being tampered with. I prefer to mark the dial with indicia showing the nominal tire sizes, but it is obvious that the dial might be marked with pressure readings, or a combination of both.

Referring to the drawings, which illustrate the preferred form of my invention, A designates a compressed air supply pipe that leads from a storage tank (not shown) to an adjustable pressure-reducing valve B, of any suitable type, that automatically governs the flow of air to a tire-filling hose C equipped with a tire chuck (not shown) that is adapted to be placed over the valve stem of a pneumatic tire. Two pressure gages D and E are combined with the pressure-reducing valve B for indicating the pressure of the supply tank and the pressure in the hose leading to the tire being filled, and a manually-operable device F is employed for controlling the pressure-reducing valve B. In the embodiment of my invention herein illustrated the pressure-reducing valve B comprises a casing 1 provided with an inlet orifice 2 that is controlled by a valve 3, as shown in Fig. 4, said inlet orifice being arranged at the end of an air supply duct 4 that is connected by means of a conduit 5 with the air supply pipe A that leads from the storage tank. The tire hose C is connected by means of a conduit 6 with the interior of the casing 1 of the valve B, as shown in Fig. 3, and an adjustable means is provided for controlling the automatic opening and closing of the valve 3. Said means preferably consists of a diaphragm G arranged in the valve casing 1, as shown in Figs. 2 and 4, a spring 7 that resists movement of the diaphragm G in one direction, a manually-operable device F previously mentioned for varying the tension of the spring 7 and an actuating device H for the valve 3 combined with the diaphragm G in such a manner that it will permit said valve 3 to seat when the diaphragm G flexes in one direction, and thereafter cause said valve 3 to open when said diaphragm flexes to the opposite direction. The peripheral edge portion of the diaphragm G is clamped tightly between the end of the valve casing 1 and the head piece 1ª of said casing, and said head piece is provided with a laterally-projecting cylindrical portion 8, as shown in Fig. 2, that forms a housing for the spring 7 and for a plunger 9 that is interposed between the spring 7 and one side of the diaphragm G. The valve-actuating device H is arranged on the other side of the diaphragm G, and said device H is provided with a center bore that is slotted so as to receive the portion in which the air inlet port 2 is formed, as shown in Fig. 4. When the valve 3 is unseated or in its open position, as shown in Figs. 2 and 4, it bears against the end wall of the internal slot in the valve-actuating device H, said valve being provided with a stem 3ª that fits loosely in the air inlet port 2. A coiled compression spring 10 is arranged between the outer end of the valve-actuating device H and a removable cap 11 on the valve casing 1, so as to exert pressure on the device H in a direction to move the valve 3 into its closed position when the internal pressure in the valve casing 1 is sufficient to overcome the pressure that the spring 7 exerts on the diaphragm G. The removable cap 11 in the valve casing 1 that forms an abutment for one end of the spring 10 is preferably provided with a cylindrical portion 11ª, shown in Fig. 2, that acts as a guide for the outer end portion of the valve-actuating device H, the inner end being fitted in a piece 100 and so guided. When the internal pressure in the valve casing 1 is sufficient to overcome the spring 7 the diaphragm G flexes to the left, looking at Fig. 2, thus permitting the device H to move to the left, under the influence of the spring 10, and consequently, causing the valve 3 to be pressed tightly against its seat around the air inlet orifice 2. As soon as the valve 3 seats, the supply of air to the valve casing 1 is cut off and said valve 3 remains seated until the internal pressure in the valve casing 1 drops sufficiently to permit the spring 7 to move the diaphragm G in the opposite direction, namely, to the right, looking at Fig. 2. The movement of the diaphragm G to the right carries the valve-actuating device H away from the valve 3, and immediately thereafter the valve 3 unseats and establishes communication between the air inlet duct 4 and the interior of the valve casing 1, the compressed air continuing to flow through the air inlet orifice 2 until the pressure is sufficient to overcome the force of the spring 7. It will thus be seen that the valve 3 opens and closes automatically as the pressure in the valve casing 1 rises and falls, the pressure in the valve casing 1 being controlled directly by the spring 7. One convenient way of constructing the manually-operable device F that governs the tension of the spring 7 is illustrated in Fig. 2, wherein it will be seen that the device F is provided with an internally screw-threaded sleeve 12 that surrounds the tubular-extension 9 on the valve casing, which tubular extension is provided with external screw threads. The outer end of the spring 7 coöperates with a spring seat 7ª that bears against an adjustable abutment 13 on the device F, as shown in Fig. 2, and consequently when said device F is turned in one direction, the tension of the spring 7 will be increased, and when said device is turned in the opposite direction, the tension of said spring will be diminished. While it is not essential to provide the device F with an adjustable abutment 13, I prefer to construct said device in this manner, so as to enable the initial tension of the spring 7 to be varied for the purpose hereinafter described. In order to eliminate the possibility of the valve 3 being rendered inoperative by particles of dirt in the air that is supplied to the reducing valve, I have arranged a screen or strainer I between the valve 3 and the air supply pipe A from the storage tank, the strainer I being preferably mounted in a cylindrical-shaped portion $4^b$ formed integral with the laterally-projecting portion on the valve casing 1 in which the air duct 4 is formed. The conduit 5 that forms a continuation of the air supply pipe A is connected to the portion $4^b$ that incases the strainer I, and said portion $4^b$ is provided at one end with a removable cap $4^c$, so as to enable the strainer I to be removed for cleaning. The gages D and E are arranged on opposite sides of the valve 3, as shown in Fig. 3, so that the gage D will indicate the pressure in the storage tank and the gage E will indicate the pressure in the casing 1 of the reducing valve, said gages being preferably mounted on short nipples that are screwed into the valve casing 1 at the upper side of same. Any suitable type of indicator or dial may be used in conjunction with the reducing valve to guide the operator in properly setting said valve, but I prefer to use an indicator composed of a stationary member 14 and a coöperating rotatable member 15 that is combined with the manually-operable device F that governs the tension of the spring 7, so as to cause the member 15 of the indicator to move with relation to the stationary member 14, whenever the device F is actuated to change the adjustment of the reducing valve. Said members 14 and 15 may be provided with any suitable indicia that will indicate the internal pressure in the valve casing 1, but I prefer to provide the member 15 with numerals that correspond to the cross-sectional sizes of standard pneumatic tires and provide the member 14 with an arrow or pointer that is adapted to coöperate with the numbers on the member 15, the reducing valve being calibrated in such a manner that when one of the numbers on the member 15 is brought into alinement with said pointer, the internal pressure in the valve casing 1 will correspond to the pressure that pneumatic tire manufacturers have adopted as a proper standard for tires of the nominal size indicated by said number. In other words, the member 15 is provided with the numbers $1\frac{1}{2}$, 2, $2\frac{1}{2}$, 3, $3\frac{1}{2}$, 4, $4\frac{1}{2}$, 5, $5\frac{1}{2}$ and 6, as shown in broken lines in Fig. 1, and the member 14 is provided at its center with an arrow or pointer $14^a$. When the device F is rotated in one direction far enough to bring the numeral 4 on the member 15 opposite the arrow or pointer $14^a$ on the member 14, the tension of the spring 7 will be such that the valve 3 will close automatically when the internal pressure in the valve casing 1 of the reducing valve reaches eighty pounds, as it is generally recognized that eighty pounds is the proper inflation for a four inch pneumatic tire. If the numeral $4\frac{1}{2}$ on the member 15 is brought opposite the arrow $14^a$, the tension of the spring 7 will be such that the valve 3 will close when the internal pressure in the valve casing 1 reaches ninety pounds, and if the numeral $3\frac{1}{2}$ is brought opposite the arrow, the valve 3 will seat automatically when the internal pressure in the valve casing 1 reaches seventy pounds. The portion of the member 15 on which the numerals previously referred to are formed preferably consists of an annular-shaped plate that is connected to a disk 16 near the inner end of the sleeve 12 of the manually-operable device F, and the member 14 preferably consists of a plate arranged above the member 15 in vertical alinement with same. The disk 16 is provided with a stop $16^a$ that strikes against the bracket 17 when the numeral 0 on the member 15 is opposite the arrow on the member $14^a$ and said member 14 is provided with suitable words and arrows that indicate just how the device F should be manipulated so as to obtain the proper inflation of the tire.

The reducing valve B, the gages D and E and the indicator that coöperates with the reducing valve are preferably arranged inside of a housing or casing J that can either be connected to a wall or other supporting structure or mounted on a hose locker, as indicated in broken lines in Fig. 1, or on a hollow post 18 that forms a housing for the air supply pipe A and for a conduit 19 that incases electric wires 20 that supply current to an electric lamp bulb 21 which is arranged inside of the casing J, so as to illuminate the gages and indicator. If desired, an electrically-operated heating element 22 consisting of an electric lamp bulb or other suitable device may be arranged inside of the casing J in proximity to the reducing valve B, so as to prevent the moisture in the air in the reducing valve from freezing in cold weather. At the upper end of the casing J is an upright or support 23 that may be used for carrying a sign or electric illuminating device $23^a$. The electric circuit that energizes the lamp 21, and the sign or lighting unit on the upright 23 is governed by a switch 24 that is arranged inside of the casing J, as shown in Fig. 3. The casing J is provided with a sight opening that is covered by a piece of glass or other suitable transparent material 25, as shown in Fig. 1, and said casing is also provided with a key-controlled door or removable section, so as to prevent unauthorized persons from removing the instruments inside of the casing or from tampering with same. In the form of my invention herein illustrated the front wall of the casing J is composed of a removable bottom section 26 provided adjacent its lower edge with inwardly-projecting arms 27, as shown in Fig. 2, that engage lugs on a stationary portion of the casing and provided adjacent its upper edge with buttons or latches 28 that can be moved into engagement with flanges 29 on the side walls of the casing J, as shown in broken lines in Fig. 1. The upper portion 26ª of the front wall is provided with ears 30 that lap over a stationary portion of the casing, and adjacent the lower edge of said upper section 26ª are two key-controlled latches or bolts 31 that are adapted to be moved laterally into engagement with the flanges 29 on the side walls of the casing. The meeting edges of the removable sections 26 and 26ª of the front wall are beveled in such a manner that the bottom section 26 cannot be removed when the upper section is in place, and the other edges of said sections 26 and 26ª that bear upon the stationary portions of the casing are so beveled that it will be impossible for water to leak through same into the interior of the casing J. I do not limit myself to these details of construction; and any other details of construction that accomplish the desired results may be employed. The switch 24 in the interior of the casing J is provided with a portion 24ª that is adapted to receive a removable key, so as to enable the circuit in which the switch is arranged to be opened and closed, only by an authorized person, one wall of the casing J being provided with an opening 32, shown in Fig. 1, through which the key can be inserted, so as to turn the switch on or off.

From the foregoing it will be seen that I have produced a tire-inflating apparatus which tends to reduce an automobilist's "tire troubles", by insuring proper inflation of the tires on his machine, for if the person using the apparatus sets the indicator to correspond with the size of the tires on his machine, the tires will be inflated to the pressure which is generally recognized as being proper for a tire of that particular size. When using the apparatus to inflate a tire it is not necessary to repeatedly test the pressure of the tire with a tire gage, as is now the general practice, owing to the fact that the apparatus is so constructed that the pressure in the tire will not be more nor less than the pressure which is correct for a tire of the size shown on the indicator, it being understood that the user sets the indicator correctly before applying the filling hose to the valve stem of the tire. While the gages D and E are not absolutely essential, they are desirable, in that they enable the user to see what the pressure of the supply tank is and also the pressure in the hose leading to the tire. The purpose of providing the manually-operable device F with the adjustable abutment 13, previously referred to, is to enable the initial tension of the spring 7 to be so set that the indicating marks on the dial will properly correspond with the desired tire pressure, and this adjustable abutment also permits of resetting the tension of the spring in case of mechanical wear of parts or fatigue of the spring 7, and also provides for reasonable latitude of adjustment in air pressures desired for the various tire sizes. As there is a small variation in the practice of different tire manufacturers as to the proper pressure to be carried in the various nominal sizes of tires, for instance, the published pressures recommended by various makers of tires for a four-inch nominal size of tire varies from about seventy to eighty pounds, averaging about seventy-five pounds, this adjustment permits of so changing the tension of the spring 7 that if the indicator of my device is set at four-inch size, a pressure anywhere from seventy to eighty pounds may be obtained, according to the adjustment of the device 13. I prefer to calibrate my dial to the average pressures recommended by well known makers of tires, and the adjustment 13 permits of commercial variations from this average without recalibrating of the dial marking.

Having thus described my invention, what I claim, and desire to secure by Letters Patent, is:

1. A tire-inflating apparatus, comprising a tire filling pipe or hose, a conduit that communicates with a supply of air under relatively high pressure, an air chamber to which said hose and conduit lead, a valve arranged so that it will be unseated by air that is admitted to said chamber, a controlling member for said valve arranged so that the pressure in said chamber will move it in one direction and thus permit the valve to seat, a variable actuating device for said controlling member that constantly exerts pressure on same in a direction tending to permit the valve to open, an adjustable indicating means provided with indicia that represents standard tire sizes or pressures, said means being adapted to be set by the user according to the size of the tire to be inflated, and means whereby the act of setting said indicating means causes the condition of said variable actuating device to be changed so that the valve will close when the pressure in said chamber reaches the degree that is proper for a tire of the size being inflated.

2. A tire-inflating apparatus, comprising a chamber provided with an air inlet through which air under relatively high pressure is supplied to said chamber, a tire-filling pipe or hose through which air is discharged from said chamber, a valve for said air inlet arranged so that it will be unseated automatically by air that is admitted to said chamber, a spring-actuated device for seating said valve, a spring-pressed diaphragm that holds said valve-actuating device in an inoperative position, said diaphragm being adapted to be operated by the internal pressure in said chamber so as to permit said valve-actuating device to seat said valve and thus cut off the supply of air to said chamber, an adjusting device for varying the tension of the diaphragm spring, and a visual indicating means that shows the user the position in which said adjusting device should be set in order to obtain the proper pressure in the tire-filling hose.

3. A tire-inflating apparatus provided with a pressure-reducing valve that automatically regulates the pressure of the supply of air to the tire being inflated, a spring-controlled device that governs said valve, an indicator that is adapted to be set in different positions, means combined with said valve-governing device and indicator for automatically changing the tension of the spring of said valve-governing device when the position of said indicator is changed, and an independent means that governs the initial adjustment of the valve.

4. A tire-filling apparatus provided with a pressure-reducing valve that automatically governs the pressure of the supply of air to the tire being inflated, a spring-pressed diaphragm that controls the seating of said valve, a manually-operable device for changing the adjustment of the spring of said diaphragm, and an indicating means consisting of a movable member and a coöperating stationary member, one of said members being provided with numerals that correspond to standard tire sizes or pressures and the movable member being combined with the manually-operable device in such a manner that its position will be changed when the adjustment of the diaphragm spring is changed.

5. A tire-inflating apparatus provided with a pressure-reducing valve for governing the pressure of the supply of air to the tire being inflated, said valve comprising a casing having a portion on the inside of same in which an inlet duct is formed, a valve that governs the supply of air to the interior of said casing, a reciprocating actuating device for seating said valve guided by the portion on the interior of the casing in which said inlet duct is formed, and a spring-pressed diaphragm for governing said valve-actuating device.

6. A tire-inflating apparatus provided with a pressure-reducing valve for governing the pressure of the supply of air to the tire being inflated, said valve comprising a casing, a valve that governs the supply of air to the interior of said casing, a reciprocating actuating device for seating said valve, a spring-pressed diaphragm for moving said valve-actuating device in one direction, a tubular projection on the casing of the valve, a plunger arranged inside of said projection between the diaphragm and the spring that moves said diaphragm, and an adjustable device mounted on the tubular projection on the valve casing for varying the tension of said spring.

7. A tire-inflating apparatus provided with a pressure-reducing valve that automatically governs the pressure of the supply of air to the tire being inflated, said valve comprising a casing, a valve for controlling communication between the interior of said casing and a supply of air under pressure, a diaphragm for governing the operation of said valve and arranged in such a manner that it will be flexed in one direction by the internal pressure in said casing, an extension on said valve casing, a spring arranged in said extension at one side of said diaphragm, a manually-operable device screw-threaded onto said extension for varying the tension of said spring, and an indicator provided with markings in terms of nominal tire sizes and composed of two coöperating elements, one of which is moved by said manually-operable device.

8. A pneumatic tire-inflating apparatus, comprising a source of air pressure, a tire-filling hose, an adjustable pressure-reducing valve arranged between said hose and source of air pressure, a device for adjusting said reducing valve, an indicating means operated by the adjusting device for enabling the operator to set the adjusting device to secure the proper pressure of air to inflate the particular size of tire being inflated, and a second adjusting device to alter the relation of the indicia on the indicating means and the air pressure corresponding to the indicia.

In testimony whereof I hereunto affix my signature in the presence of two witnesses, this 24th day of January, 1916.

GEORGE F. STEEDMAN.

Witnesses:
L. S. BUCKLES,
J. F. D. HOWELL.